United States Patent [19]
Heidorn et al.

[11] Patent Number: 6,098,081
[45] Date of Patent: *Aug. 1, 2000

[54] HYPERMEDIA NAVIGATION USING SOFT HYPERLINKS

[75] Inventors: Christopher S. Heidorn, Bellevue; David McCauley, Seattle, both of Wash.

[73] Assignee: Microsoft Corporation, Redmond, Wash.

[*] Notice: This patent issued on a continued prosecution application filed under 37 CFR 1.53(d), and is subject to the twenty year patent term provisions of 35 U.S.C. 154(a)(2).

[21] Appl. No.: 08/643,330

[22] Filed: May 6, 1996

[51] Int. Cl.[7] .................................................. G06F 17/30

[52] U.S. Cl. ............................................... 707/501; 707/3

[58] Field of Search ................................. 707/500–502, 707/513–516, 907, 3–6; 345/326, 329, 335; 709/217–219, 203

[56] References Cited

U.S. PATENT DOCUMENTS

| | | | |
|---|---|---|---|
| 5,388,259 | 2/1995 | Fleischman et al. | 395/600 |
| 5,408,655 | 4/1995 | Oren et al. | 395/600 |
| 5,446,891 | 8/1995 | Kaplan et al. | 395/600 |
| 5,506,984 | 4/1996 | Miller | 395/600 |
| 5,574,898 | 11/1996 | Leblang et al. | 395/601 |
| 5,590,362 | 12/1996 | Baum et al. | 395/800 |
| 5,600,831 | 2/1997 | Levy et al. | 395/602 |
| 5,603,025 | 2/1997 | Tabb et al. | 395/602 |
| 5,649,186 | 7/1997 | Ferguson | 395/610 |
| 5,694,594 | 12/1997 | Chang | 395/606 |
| 5,724,567 | 3/1998 | Rose et al. | 707/4 X |
| 5,737,592 | 4/1998 | Nguyen et al. | 707/4 |
| 5,761,662 | 6/1998 | Dasan | 707/10 |
| 5,855,015 | 12/1998 | Shoham | 707/5 |
| 5,920,859 | 7/1999 | Li | 707/5 |

OTHER PUBLICATIONS

Hu, Jian, "Webin Tool User Guide Version 0.92", BBSRC Roslin Institute (Edinburgh) UK, <http://anita.jax.org/webintool–0.921 cb/docs/user–guide.html>, 26 pages, Jul. 1995.

Jul. 1995, May 1996.

Qian et al., "Abstraction and Inheritance of HyperLinks in an Object–Oriented Hypertext Database System TextLink/Gem", IEICE Trans. Inf. & Syst., vol. E78–D (1995) Nov., No. 11, pp. 1343–1352.

DeRose SJ & Durand, D.G., "making Hypermedia Work, A User's Guide to HyTime", 1994, Dorderecht: Kluwer Academic Publishers, p. 119, "7.4.2 Query Links".

(List continued on next page.)

*Primary Examiner*—Joseph H. Feild
*Attorney, Agent, or Firm*—Lee & Hayes, PLLC

[57] ABSTRACT

A hypermedia-based navigation system includes a plurality of information providers and one or more clients. Databases of available hyperlink targets are maintained by the information providers. Each of the databases is searchable by means of one or more query attributes supported by the database and relating to the available hyperlink targets. A hypermedia document might contain a soft hyperlink, consisting of a query formulation specified in terms of query attributes and of values for said query attributes. A client resolves a soft hyperlink by querying at least one of the databases with the query formulation to locate one or more hyperlink targets having attributes and attribute values that satisfy the query formulation. The soft hyperlink can additionally contain executable rules. The client executes these rules prior to submitting the query formulation to the database. Each rule, when it executes, potentially adds search predicates to the original query formulation. Execution of a particular rule is conditioned upon a set of mandatory attributes associated with the rule. The rule will be executed if and only if its mandatory attributes are bound to actual values by the particular client attempting to resolve the soft hyperlink.

52 Claims, 6 Drawing Sheets

OTHER PUBLICATIONS

Derose, SJ, "Expanding the Notion of Links", Proceedings of Hypertext 89, Nov. 1989, pp. 249–257, "2. Intensional Links".

Gronbaek et al., Cooperative Hypermedia Systems: A Dexter Based Architecture, Communications of the ACM, v. 37, n.2, p. 65–74, Feb. 1994.

Halasz et al., The Dexter Hypertext Reference Model, Communications of the ACM, v.37, n.2, p. 30–39, Feb. 1994.

Schatz et al., Searching in a Hyperlibrary, Data Engineering 1989 5th Intl Conf., p. 188–197, 1989.

Davis, To Embed or Not To Embed, Communications of the ACM, v.38, n.6, p. 108–109, Aug. 1995.

Goodman, The Complete Hypercard Handbook, p. 185–192, 1987.

Keenan, Stack Fron Ends Put SQL In A Script, MacWeek, v.4,n.30,p.45(4), Sep. 11, 1990.

HYPERMEDIA NAVIGATION USING SOFT HYPERLINKS

BACKGROUND OF THE INVENTION

"Hypermedia" is a metaphor for presenting information in which text, images, sounds, and actions become linked together in a complex, non-sequential web of associations that permit a user to browse through related topics, regardless of the presented order of the topics. Hypermedia arises from "hypertext," a term which was originally coined to describe text-based documents including links to other such documents to form a non-sequential web of associated ideas.

Hypermedia content is widely used for navigation and information dissemination on the "World-Wide Web" (WWW or Web) of the Internet. An application program referred to as a "Web browser" is normally used to retrieve and render hypermedia content from the WWW.

Hypermedia content is commonly organized as documents with embedded control information. The embedded control information includes formatting specifications, indicating how a document is to be rendered by the Web browser. In addition, such control information can include links or "hyperlinks": symbols or instructions telling the Web browser where to find other related WWW documents on the Internet. A hyperlink from one hypermedia topic to another is normally established by the author of a hypermedia document, although some applications allow users to insert hyperlinks to desired topics.

A hyperlink is typically rendered by a Web browser as a graphical icon or as highlighted keywords. A user "activates" or "follows" a hyperlink by clicking on or otherwise selecting the icon or highlighted keywords. Activating a link causes the Web browser to retrieve and render the document or resource that is targeted by the hyperlink.

Associated with a hyperlink's icon or highlighted keywords is an underlying target specification. The target specification is set forth in the underlying hypermedia document, but is normally invisible to the user. The target specification unambiguously identifies a targeted document or resource, typically specifying the name of the computer on which the document resides and the complete file name of the document. In WWW documents, targets are specified using "uniform resource locators" (URls). A URL describes everything about a particular resource that a Web browser needs to know to request and render it. The URL describes the protocol a browser should use to retrieve the resource, the name of the computer it is on, and the path and file name of the resource.

Hypermedia content utilized by the WWW is commonly written using what is referred to as a "markup language." "SGML" (Standard Generalized Markup Language) is one such language, defined formally as "a language for document representation that formalizes markup and frees it of system and processing dependencies." SGML is a language for describing the structure of documents and for describing a tagging scheme to delineate that structure within text.

For creating hypermedia content, WWW documents utilize a specialization of SGML called "HTML" (Hypertext Markup Language). An HTML textual document can be thought of as plain text that contains formatting instructions in the form of HTML markup codes or "tags." Tags tell Web browsers how to render and print documents, and are also used to specify hyperlinks.

The following is a simple example of a short hypertext document containing a single hyperlink:

Microsoft has a Web page with the latest <A HREF="HTTP://www.microsoft.com/upgrades">upgrades</A> to its popular word processing program.

In this example, the word "upgrades" would appear highlighted to the user, and the text within the angled brackets would not appear at all:

Microsoft has a Web page with the latest upgrades to its popular word processing program.

By clicking on the highlighted keyword "upgrades," the user can instruct the Web browser to activate the underlying target specification. In this case, the underlying target specification is to an HTTP (HyperText Transport Protocol) document located at computer "www.microsoft.com," having the file name "upgrades."

The angled brackets in the example define hypertext tags. In most cases, tags occur in pairs: a start tag and an end tag. The start tag indicates where a particular formatting is to begin, and a corresponding end tag indicates where the formatting is to end. A start tag begins with a code (after the leading angled bracket) indicating a tag type. An end tag consists of that same code, preceded by a forward slash.

In the example above, the leading "A" in the start tag indicates that it is an "anchor" tag—the type of tag that defines a hyperlink. The start tag contains a tag "attribute," indicating a target specification:

HREF="HTTP://www.microsoft.com/upgrades".

In concept, the target of a hyperlink can be virtually any type of object—including executable programs, text or multimedia documents, sound clips, audio segments, still images, computers, directories, and other hyperlinks. In WWW documents, hyperlink targets are most often files that can reside on any computers connected to the Internet. However, a hyperlink target can also be a particular location within a document, including the document that is currently being rendered.

Hypertext usage is not limited to the Internet. Various multimedia applications utilize hypertext to allow users to navigate through different pieces of information content. For instance, an encyclopedia program might use hyperlinks to provide cross-references to related articles within an electronic encyclopedia. The same program might also use hyperlinks to specify remote information resources such as WWW documents located on different computers.

Although the concept of hyperlinks adds incredible interest and convenience to many applications such as WWW browsers, navigating through vast quantities of information requires significant input by a user. Consider, for example, the theoretical problem of using an information resource such as the WWW to find an appropriate restaurant for dining in the Seattle area. Suppose further that a great many restaurants in the Seattle area have informative Web pages (possibly including complete menus and prices) on the Internet.

To make any use of these Web pages, it is first necessary to find them. Assuming their URLs are available in some type of address book, it might still be a daunting task to manually enter the URLs and to examine the Web pages of a large number of restaurants. Fortunately, there are some available tools which might facilitate or automate some of this process. For instance, a user might make use of an available search engine and associated database to perform a search based on certain key words. A search engine such as this might return a formatted document or directory having hyperlinks to the Web pages found as a result of the search. Alternatively, a lucky user might find a Web page directory that already lists hyperlinks to the Web pages of Seattle restaurants. An even luckier user might find a Web page having hyperlinks to Seattle restaurant Web pages, categorized by type of cuisine.

While these prior art methods are somewhat workable, frequent users of the WWW realize that they are often unreliable and nearly always time-consuming. Specifying an appropriate search query for a search engine, for instance, is not always simple and does not always result in the desired results. Similarly, just finding a Web page directory of desired information is often very difficult and time-consuming. Furthermore, the information listed in the directory is often incomplete, out of date, or not categorized in a way that the user finds useful. Quite often, the only way to find current information is to actually examine a great many WWW documents, on a hit-or-miss basis, until an appropriate document or resource is found. This can waste a great deal of time.

The inventors believe that there is a better way of directing users to desired information.

SUMMARY OF THE INVENTION

The invention utilizes what will be referred to herein as "soft" hyperlinks. A soft hyperlink is a link that is not fully resolved when it is written. Further information is required to identify the ultimate target of the hyperlink.

The inventors have defined a hypermedia navigation system that allows hyperlinks to specify hyperlink targets that can be resolved in a way that is dependent on characteristics and preferences of a particular user. To be compatible with the navigation system, information providers maintain databases of available hyperlink targets. Each database supports a set of attributes, and stores appropriate attribute values for each hyperlink target. For instance, a database might support an attribute indicating the reading level required to understand target content, and another attribute indicating the general nature of the target content (fiction/non-fiction). Values for these attributes would be stored in the database for each available hyperlink target.

A user's computer maintains similar information relating to the user, to the user's computer and system, and to the world in general. This information is categorized in terms of attributes—similar or identical to the attributes used by the databases. The computer maintains a list of bound attributes—attributes that have values. These attributes include "ambient" attributes having values that are specified independently of hypermedia content. They also include "link" attributes that are specified in a selected hyperlink. Furthermore, the list of bound attributes might include "context" attributes that are specified in a currently-rendered hypermedia document. The ambient attributes are relatively permanent, while the link and context attributes change as the user navigates between and within documents.

The user's computer also maintains a list of available databases, along with the different attributes supported by the respective databases.

A "soft" hyperlink, as used herein, comprises a partially-specified query rather than a conventional target specification. The query is expressed in terms of attributes supported by the databases. The soft hyperlink also contains one or more executable rules. The purpose of the rules is to add further search predicates to the query. In addition, a soft hyperlink can contain a specification of bound attributes for temporary inclusion in the list of bound attributes maintained by the user's computer.

To resolve a soft hyperlink, an application such as a Web browser identifies and extracts the partially-specified query from the hyperlink along with the rules and link attributes specified in the hyperlink. Each rule is associated with a set of mandatory attributes that are also specified in the hyperlink. The Web browser executes each rule if and only if its associated mandatory attributes are found in the computer's list of bound attributes. During execution, a rule examines the list of bound attributes and potentially adds search predicates to the query, depending on the values of the bound attributes.

After all the appropriate rules have executed, the query is submitted to one or more appropriate databases. The appropriate databases are selected based on whether they support the attributes ultimately specified in the query. The database (s) return one or more hyperlink targets, in the form of target specifications. If only one target is returned, that target is activated automatically (the targeted document is retrieved and rendered). If more than one target is returned, the choices are rendered as hyperlinks, and the user can choose which of them to activate.

To introduce a measure of uniformity into the system, attributes are organized into different schemata. Each schema defines a number of semantically related attributes. Rather than keeping track of the individual attributes supported by a database, the user's computer actually tracks which schemata are supported by each database.

Schemata are further organized under different models, such as user models, device models, business models, world models, etc. Different models are registered with a particular computer. Any model can specify its own rules. "Ambient" rules from the models and "link" rules from a selected hyperlink are combined in a rule base and executed individually as appropriate according to whether their mandatory attributes are bound and present in the list of bound attributes.

DETAILED DESCRIPTION

Figure 1:
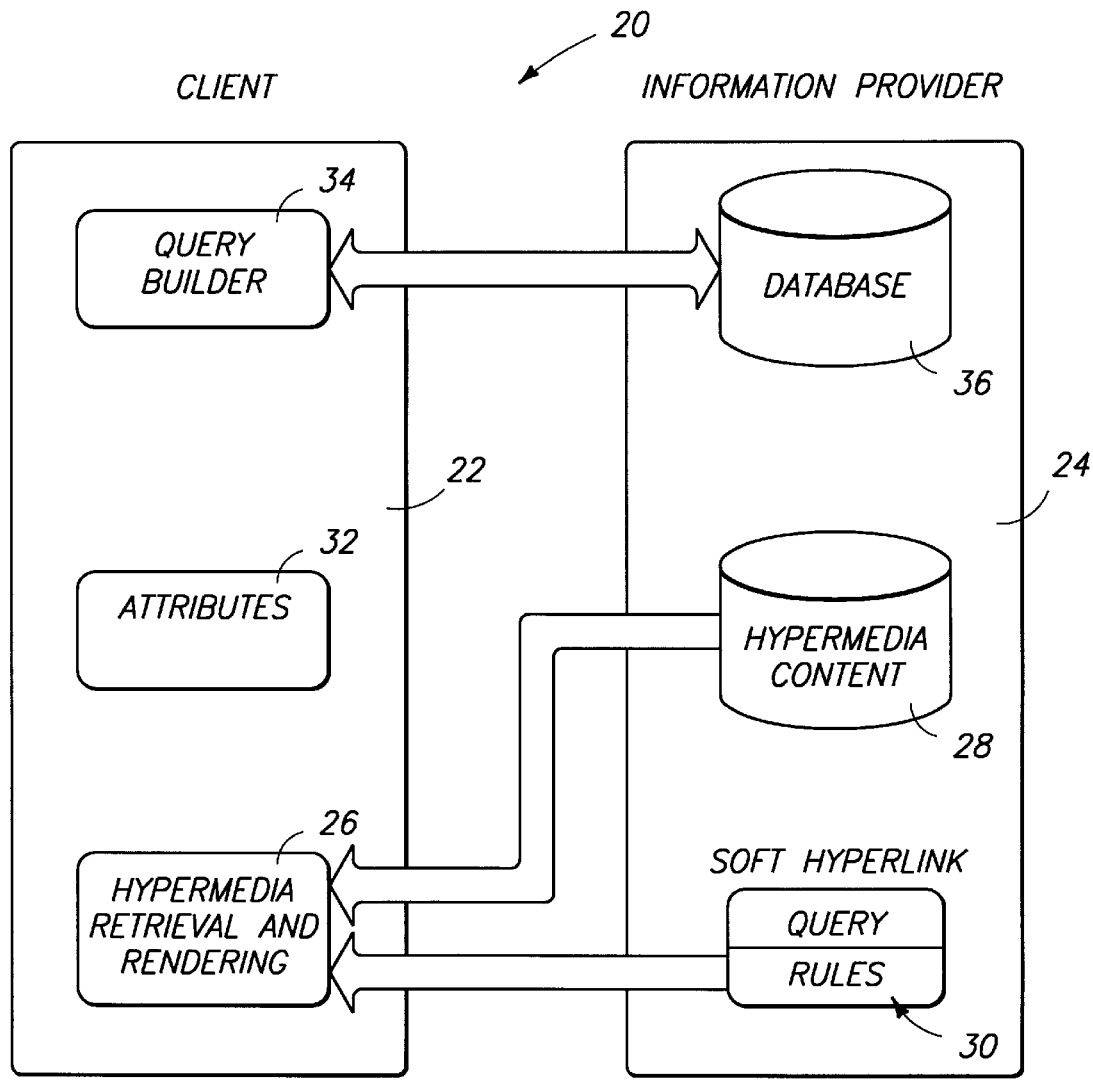
FIG. 1 is a block diagram of a hypermedia-based navigation system in accordance with a simplified embodiment of the invention.

FIG. 1 is a representation of a hypermedia-based navigation system in accordance with a simplified embodiment of the invention, generally designated by reference numeral 20. System 20 includes a client 22, preferably comprising a personal computer or other hypermedia selection, retrieval, and rendering device.

System 20 includes an information provider 24 that provides hypermedia documents to client 22 through conventional communication channels and protocols such as the Internet or another wide-area or local-area network or some other type of information distribution media.

Client 22 includes conventional hypermedia retrieval and rendering software 26 for retrieving hypermedia content from information provider 24 and for rendering it in accordance with conventional HTML instructions. Software 26 resides on a computer-readable storage medium such as a magnetic storage or electronic randomly-addressable memory, programmed in accordance with steps that will be further described below. This software understands conventional "hard" hyperlinks, and is capable of retrieving or navigating to hypermedia documents or resources specified as targets in such hard hyperlinks. A hard hyperlink is one containing a completely resolved target specification. A conventional HTML hyperlink is an example of a hard hyperlink.

In addition, client 22 is capable of resolving "soft" hyperlinks. A soft hyperlink is one which does not contain a resolved target specification. Rather, a soft hyperlink specifies elements that enable client 22 to resolve the hyperlink when it is activated, based on variable factors.

Information provider 24 contains hypermedia content 28, in the form of a number of computer-readable hypermedia documents or files. These documents include information content for display or rendering to a user. Any of these documents potentially contains soft hyperlinks, an example of which is shown as soft hyperlink 30. Hyperlink 30 can be activated by the user in a conventional manner when the associated informational material is displayed.

Generally, client 22 obtains and displays a hypermedia document that includes a list of one or more soft hyperlinks. In response to the user activating one of the soft hyperlinks, a query is performed for one or more hypermedia targets. Rather than requesting search limitations from the user, the query is formulated using attributes associated with the user, attributes specified in the hypermedia document, and attributes specified in the activated soft hyperlink. As result of the query, client 22 displays a list of the hypermedia targets in the form of further hyperlinks, possibly including both soft and hard hyperlinks.

As shown in FIG. 1, soft hyperlink 30 contains or is associated with a query formulation and one or more executable rules for potentially adding search predicates to the query formulation. It does not contain a conventional target specification such as a URL designation.

The query formulation of soft hyperlink 30 is specified at least partially in terms of query attributes and of values for the specified query attributes. A query attribute and a corresponding value describe some characteristic of a hypermedia target. For instance, a query attribute might indicate the type of cuisine featured in a particular hypermedia document.

Client 22 maintains a list of bound user attributes 32. In the simplified example of FIG. 1, these attributes describe characteristics and preferences of a particular user, preferably based on a user profile that can be edited by the user. The bound user attributes might indicate, for example, the geographic location of the user, his or her age, dining preferences, and numerous other things.

Client 22 includes a query builder 34. The purpose of query builder 34 is to formulate a query that will identify a hyperlink target based on the information from soft hyperlink 30 and the user attributes in the list of bound user attributes 32. The query builder starts with the query formulation specified in soft hyperlink 30. It then executes the rules specified in soft hyperlink 30 and other rules potentially specified within client 22. The purpose of each rule is to further refine the query formulation by adding search predicates or query fragments to the original query formulation. In order to decide how to refine the query, a rule examines the list of bound user attributes 32. This allows the rule to customize the query based on user characteristics and preferences. After all the rules have executed, the query is submitted to a database 36 for identification of possible hyperlink targets meeting the search criteria.

Information provider 24 maintains database 36 to accept queries formulated in terms of the query attributes described above. In response to a query, database 36 returns a list of hyperlink targets that meet the search criteria. These targets are typically specified as hard hyperlinks, although database 36 might also return one or more soft hyperlinks. The returned target specifications might be to resources within the content 28 of the information provider itself, or might be to content provided by other information providers. Client 22 lists these targets for the user, and the user can activate one of the targets by selecting it. If only one target is returned, client 22 might activate it without further input from the user.

Consider again the example of a user who wants to find a restaurant for an evening's meal. The user first needs to find a soft hyperlink that identifies "restaurants" as its topic. Suppose that the author of the soft hyperlink intended it to direct the user only to restaurants meeting the user's particular preferences. Thus, the query formulation in the hyperlink specifies only that the results of the query should be limited to restaurants. However, the author also specifies several executable rules in the query. These rules examine the user's list of bound attributes to determine location, cuisine preferences, and other information that might help narrow the choices of available restaurants. After looking at the user's bound attributes, the rules add appropriate search predicates to the original query formulation. The query is then submitted to the database, which returns a list of hard links to web pages of restaurants that closely parallel the user's preferences and characteristics. As a more specific example, specified rules might attempt to tailor the search query to the user's age. If the user was under 16 years old, a rule might add search predicates limiting the query to fast food restaurants within a short distance of the user's geographical location. If the user was a senior citizen, a rule might add search predicates limiting the query to restaurants offering discounts to senior citizens.

Since the list of bound attributes will vary with each user, two different users will possibly be directed to different targets, even though they have selected the same soft hyperlink.

The list of bound attributes is derived primarily from a user profile. The user enters this information on an input screen or window that is formatted conveniently for manual data input. The user profile might include many different items of information, such as name, age, reading level, geographical information, types of available transportation, income, spending habits, etc. The list of bound attributes can also contain entries that are based on information gathered automatically from the user's computer, such as various characteristics of the computer itself. In some cases, it might be possible to automatically gather some information about the user.

Figure 2:
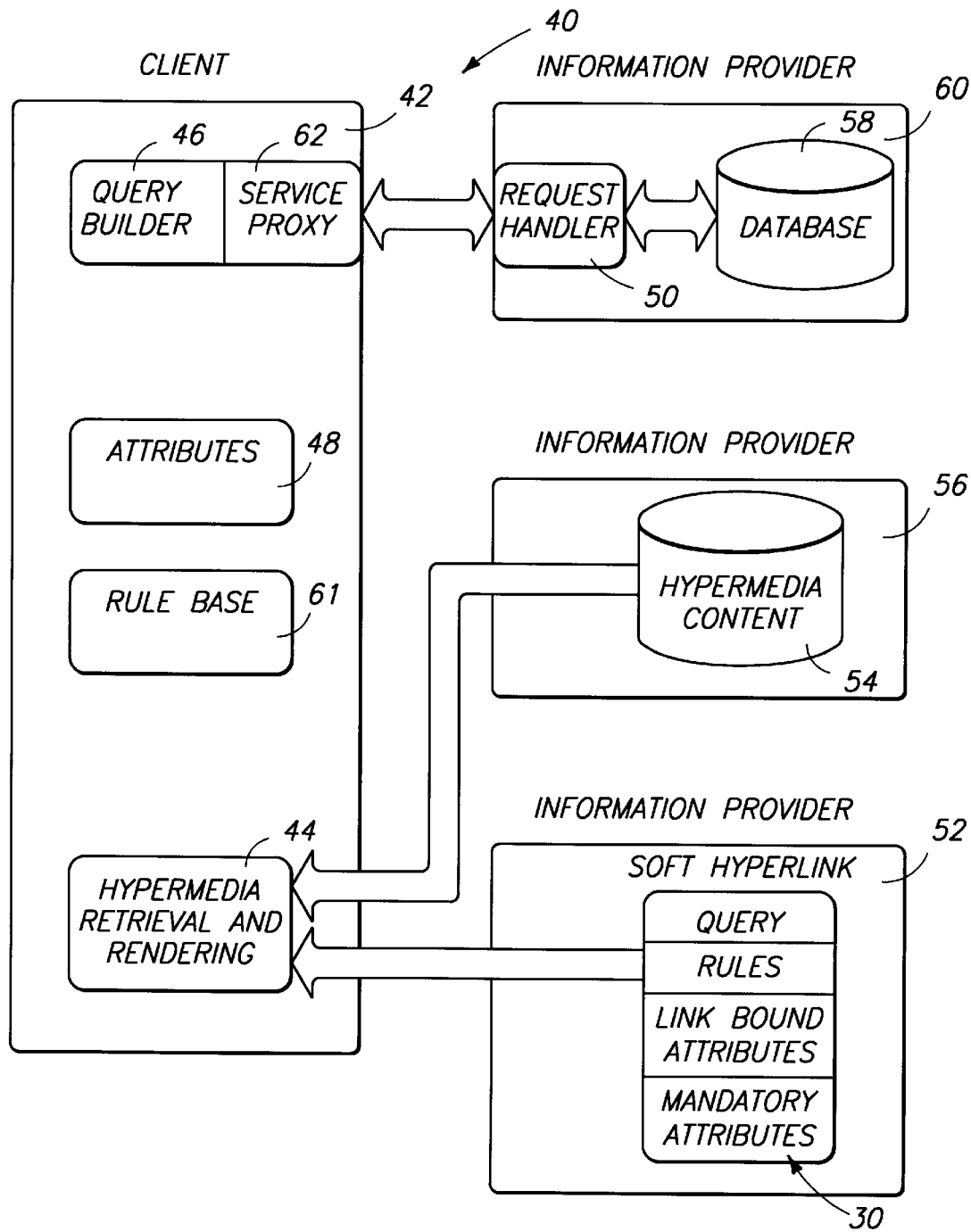
FIG. 2 is a block diagram of a hypermedia-based navigation system in accordance with a more complex embodiment of the invention.

FIG. 2 shows a representation of a hypermedia-based navigation system in accordance with a preferred embodiment of the invention, generally designated by reference numeral 40. System 40 is similar in many respects to system 20 of FIG. 1, including a client 42 with a hypermedia retrieval and rendering component 44, a query builder 46, and a list of bound attributes 48. In this case, client 42 is connected over one or more network communication paths to communicate with several different information or service providers. A soft hyperlink 50 is contained in a document from a first information provider 52; various hypermedia content 54 is available from a second information provider 56, and a database 58 of available hyperlink targets is maintained by a third information provider 60 (similar to database 36 of FIG. 1). The operation of system 40 is similar to that of system 20 of FIG. 1, with a few additional elements. First, note that client 42 maintains a "rule base" 61. This is a list of rules that are to be executed by query builder 46 prior to submitting a query to database 58. Many of these rules come from a currently-selected soft hyperlink, as described above with reference to FIG. 1. However, the rule base can also contain rules that are specified independently of any particular soft hyperlink. Such "ambient" rules can be specified, for instance, by a user or by an application running on the user's computer.

Note also that soft hyperlink 50 contains two new elements: "link bound attributes" and "mandatory attributes." Link bound attributes are attribute and value pairs that are to be added to the user's bound attribute list before execution of the executable rules relating to the soft hyperlink. Mandatory attributes are unbound attributes that are associated with each executable rule specified in the soft hyperlink. A particular rule is allowed to execute if and only if its mandatory attributes are present and bound in the user's bound attribute list.

A further feature of system 40 is that queries are passed to the database through a "service proxy" 62. A service proxy is associated with each different information provider that provides a searchable database. The service proxy is an executable program or programming interface that resides and executes on client 42.

The primary responsibility of the service proxy is to translate a query into a format that will be understood by the information provider, and to send the translated query to the information provider. A corresponding "request handler" 64 at the information provider receives the query and either executes it against database 58 or submits it to a database server. In the preferred embodiment, query builder 46 formulates a query that is similar or identical to an SQL (Structured Query Language) query. The service proxy translates the query from this standard language into a language that its information provider can understand. It is useful to incorporate a macro interpreter in the service proxy so that a variable can be expressed in a search query in general terms rather than as a specific value. Some search criteria may be best specified in relative terms rather than absolute terms—such as whether a restaurant is "expensive." Different information providers might have different concepts of what constitutes an "expensive" restaurant. With a macro interpreter, a search query can be formulated to specify, for instance, that search results should be limited to restaurants that are "moderately expensive." The service proxy for each information provider will interpret this differently, and will submit a query to the information provider in appropriately concrete terms.

Figure 3:
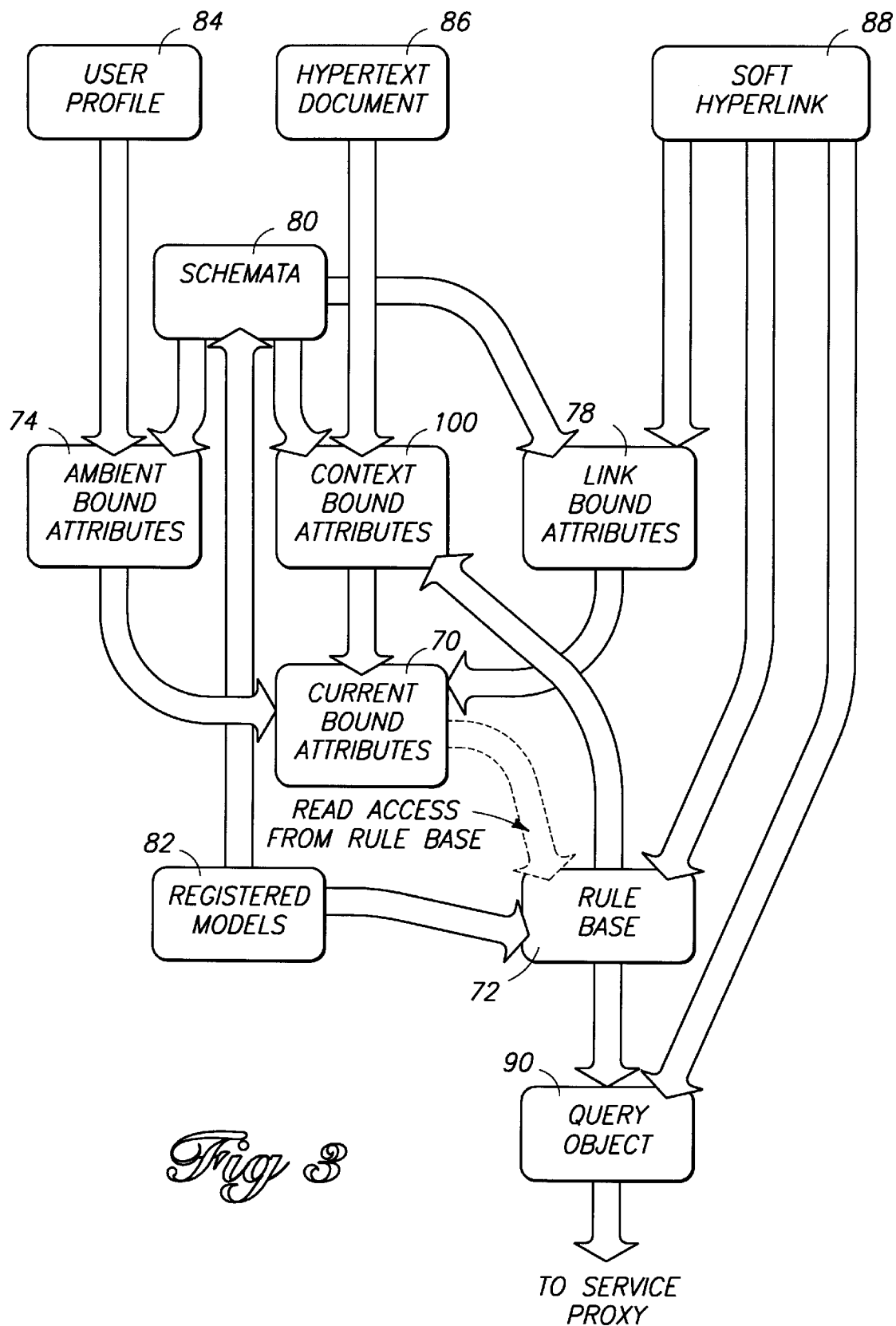
FIG. 3 is a block diagram showing various logical elements of the navigation system of FIG. 2.

FIG. 3 illustrates the logical organization of rules and attributes in the preferred embodiment of the invention. Rules and attributes are organized and managed under a general heading of "models." A model is an abstract representation of knowledge about a particular domain and the reasoning that takes place over that knowledge. For example, one model (a "user" model) might contain information about a user (e.g., name, location, likes, dislikes, patterns of behavior, etc.) as well as "rules" that dictate how to manipulate and combine that information in interesting and beneficial real-world ways. A model is preferably limited to one real-world concept or domain. The user domain is one example. Other examples include "device," "business," and "world" domains. A device domain includes information about a client or server device. A business domain includes information relating to businesses. A world domain includes information that is globally true, such as conversion factors, laws of nature, etc.

A model is organized as one or more schemata. A schema defines a number of related attributes. Within a model, an attribute is merely defined; it is not assigned any particular value. However, at some point the model is applied to a particular entity, such as a user or business. A model is applied to an entity by assigning values to the attributes of the model, at which point the attributes are said to be bound. Each instance of an entity might have its own set of bound attributes corresponding to the unbound attributes of a particular model. For example, each user will have a set of bound attributes under one or more models. Similarly, a given hyperlink target can be associated with a set of bound attributes from a model or from certain schemata of the model. It is these bound attributes that are used for searching in databases 36 and 58.

Each attribute in a schema has a name and associated type. An attribute is typically referred to by its schema and its name. For example, an attribute having the name current_location from the user schema might be of a type location, consisting of a latitude and longitude pair, each of which are type real. This attribute is referred to as user.current_location. When bound, it may take on the value (47.6233, 122.3204), indicating a geographical location at latitude 47.6233 and longitude 122.3204.

In the preferred implementation of the invention, the reasoning part of a model is implemented as one or more executable "rules." A rule is implemented as an executable program or module as already discussed above. During execution, a rule typically examines bound attributes and performs actions depending on the values of the attributes. More specifically, a rule adds one or more search predicates or limitations to a query, depending on a user's bound attributes.

Various models can be registered on a user's computer. Such registration can be performed at the user's direction, or automatically and dynamically by different information providers as the user navigates from one information provider to another. It may be desirable for hypermedia documents or hyperlinks within such documents to specify pointers or URLs to models that are used by the documents or hyperlinks. Upon encountering a new model, the user's computer would automatically retrieve and register the model. Hypermedia documents and hyperlinks might alternatively contain pointers or URLs to schemata used by the documents and hyperlinks, for retrieval by the user's computer.

The computer stores these models and in many cases allows the user to assign values to the attributes defined by the models. When a user assigns a value to an attribute, that attribute is bound and is therefore placed in the user's list of bound attributes. Similarly, a registered model might include or specify one or more executable rules that make use of the attributes defined by the model. These rules, or references to these rules, are placed in the rule base maintained by the user's computer.

FIG. 3 shows a list of bound attributes 70 and a rule base 72. The list of bound attributes is maintained by a user's computer and can change as the user navigates from one hypermedia resource to another. In general, the list of bound attributes is made up of three different lists: a list of "ambient" bound attributes 74, list of "context" bound attributes 76, and a list of "link" bound attributes 78. The various attributes contained in these lists are defined by one or more schemata 80, which are in turn used by one or more registered models 82.

The values for the list of ambient bound attributes come primarily from a user profile 84. Such values might also be gathered automatically by an application program. Ambient bound attributes generally remain constant as the user navigates through different hypermedia documents. A user's current geographic location is an example of an ambient bound attribute.

The values for the list of context bound attributes are specified in whatever particular hypermedia document or resource 86 is currently activated. These values are constant as long as the resource is activated, but change when the user navigates to a different resource. As an example, a particular hypermedia document that discusses Chinese food might set a "cuisine" attribute to "Chinese."

The values for the list of link bound attributes come from a particular soft hyperlink 88 that the user has activated. These values are maintained only until resolution of the soft hyperlink. For example, a soft hyperlink might specify a maximum allowed commute time for a user to any restaurant selected through the soft hyperlink.

Rule base 72 contains a plurality of rules and associated mandatory attributes. The rules can be specified by any one of the registered models 82, in which case they are referred to as "ambient" rules, or by a particular selected soft hyperlink 88, in which case they are referred to as "link" rules. Ambient rules are relatively constant, while link rules change upon selecting each new soft hyperlink.

To resolve a soft hyperlink such as soft hyperlink 88, the query builder constructs a query formulation or object 90. Initially, the query object consists of a partially-specified query formulation obtained from soft hyperlink 88. To add limitations or search predicates to this query formulation, the rules of the rule base are executed one by one, in turn. In the preferred implementation, each rule is executed if and only if its mandatory attributes are bound in the list of current bound attributes 70. During execution, a rule can read the values of attributes from the bound attribute list 70. In addition, a rule can add bound attributes to the list of context bound attributes 76. Depending on the values found in bound attribute list 70, the rule might or might not add an additional search predicate to query object 90.

The query builder steps through the rules of rule base 72. Since a rule has the potential of changing bound attributes, one rule might cause the mandatory attributes of another rule to become bound. Thus, the query builder passes through the rules a number of times, until further passes do not result in any more rules being executed. However, each rule is allowed to execute only once.

In practice, a rule specifies mandatory attributes and optional attributes. These specified attributes are all of the attributes that will be used by the rule. When a rule is executed or "fired," it is passed three objects: the ambient bound attribute list, the context attribute list, and the query object. The rule uses the values of the mandatory attributes, as well as values from the ambient and context bound attribute lists, to decide whether to add one or more query fragments to the query object. The query object maintains the query fragments over the execution of many rules.

The following is an example of a possible rule specified by the "world" model:

```
World rule:
    Requires:
        user.curr_location_latitude
        user.curr_location_longitude
    Optional:
        world.max_commute_time
        world.avg_speed_mph
        business.rank_with_distance
        user.cost_commute_mile
    Logic:
        if world.max_commute_time and
        world.avg_speed_mph are bound, then
            add query predicate that
            destination must be located within
            commuting distance of user's
            current location
        if business.rank_with_distance is bound
        and "true" and user.cost_commute_mile
        is bound, then
            add query rank expression that
            ranks destination based on cost
            to commute
```

This rule specifies mandatory attributes user.curr_location_latitude and user.curr_location_longitude, and will therefore execute only if these attributes are bound in the user's bound attribute list.

The rule specifies optional attributes world.max_commute_time, world.avg_speed_mph, business.rank_with_distance, and user.cost_commute_mile. During execution, the rule will add query predicates depending on the values of these attributes.

The example gives a good example of attributes defined under a world model: world.max_commute_time and world.avg_speed_mph. These are attributes that might be set up to be constant for all users. The attribute user.cost_commute_mile, on the other hand, represents the cost of commuting one mile. The value of this attribute will vary from one user to another.

In actual practice, a rule is compiled from a high-level language into an executable, callable program module. It might be possible to actually embed the rule in its soft hyperlink. However, it is more likely that rules will be stored on a user's computer and specified in the hyperlink by some type of global identifier, along with a pointer or URL to a location from where the actual executable code of the rule can be obtained. With the global identifier, the user's computer can check to see if it already has the rule, and, if not, can retrieve it from the location referred to in the soft hyperlink.

Figure 4:
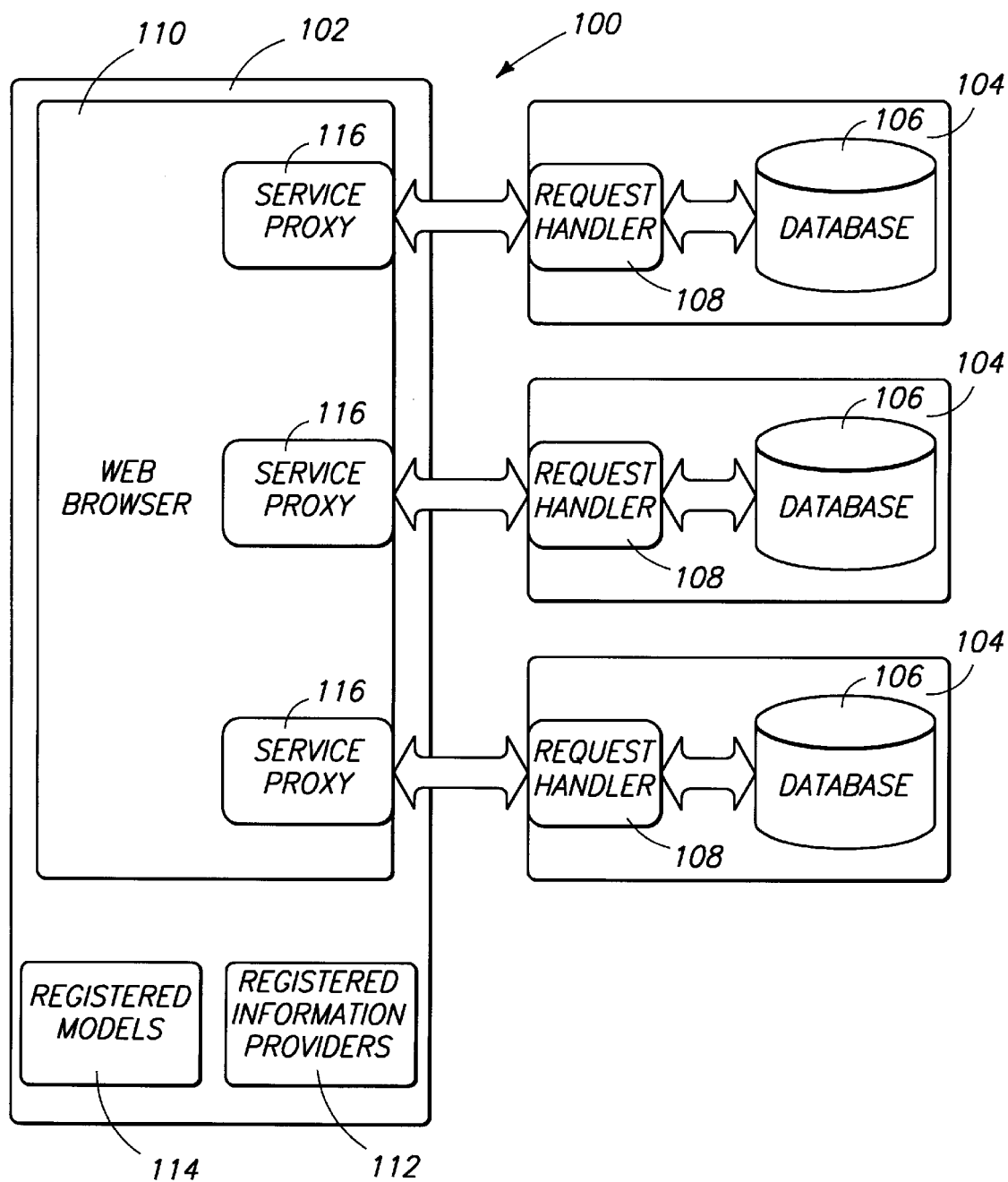
FIG. 4 is a block diagram showing additional features of a navigation system such as shown in FIG. 2.

FIG. 4 shows a system configuration 100 in accordance with the invention in which a client 102 communicates with a plurality of information providers 104, each providing its own target database 106 of available hyperlink targets and a corresponding request handler 108. The various client components discussed with reference to FIGS. 1 and 2 are implemented in a Web browser application program 110 that executes on client 102.

In the configuration of FIG. 4, each client maintains a list of registered information providers 112, along with the schemata they support. An information provider is said to support a schema if its database is searchable in terms of the attributes defined by the schema. Each client also maintains a list of registered models 114 as already discussed with reference to FIG. 3. Web browser 110 includes service proxies 116 for each registered information provider.

Web browser 110 functions as described above to formulate a query for submission to a database of available hyperlink targets. In this case, however, a decision must be made as to which information provider or database is to perform the query. This decision is made on the basis of the schemata supported by the various available information providers and databases. Once the query is formulated and ready for submission to one or more databases, Web browser 110 determines which attributes are specified in the query and to which schemata they belong. It then identifies the registered information providers that support those schemata, and submits the query to those information providers. In some cases, it may be that no information provider supports all of the schemata used in the query, in which case the query is submitted to the information provider that supports the greatest number of the schemata used.

Figure 5:
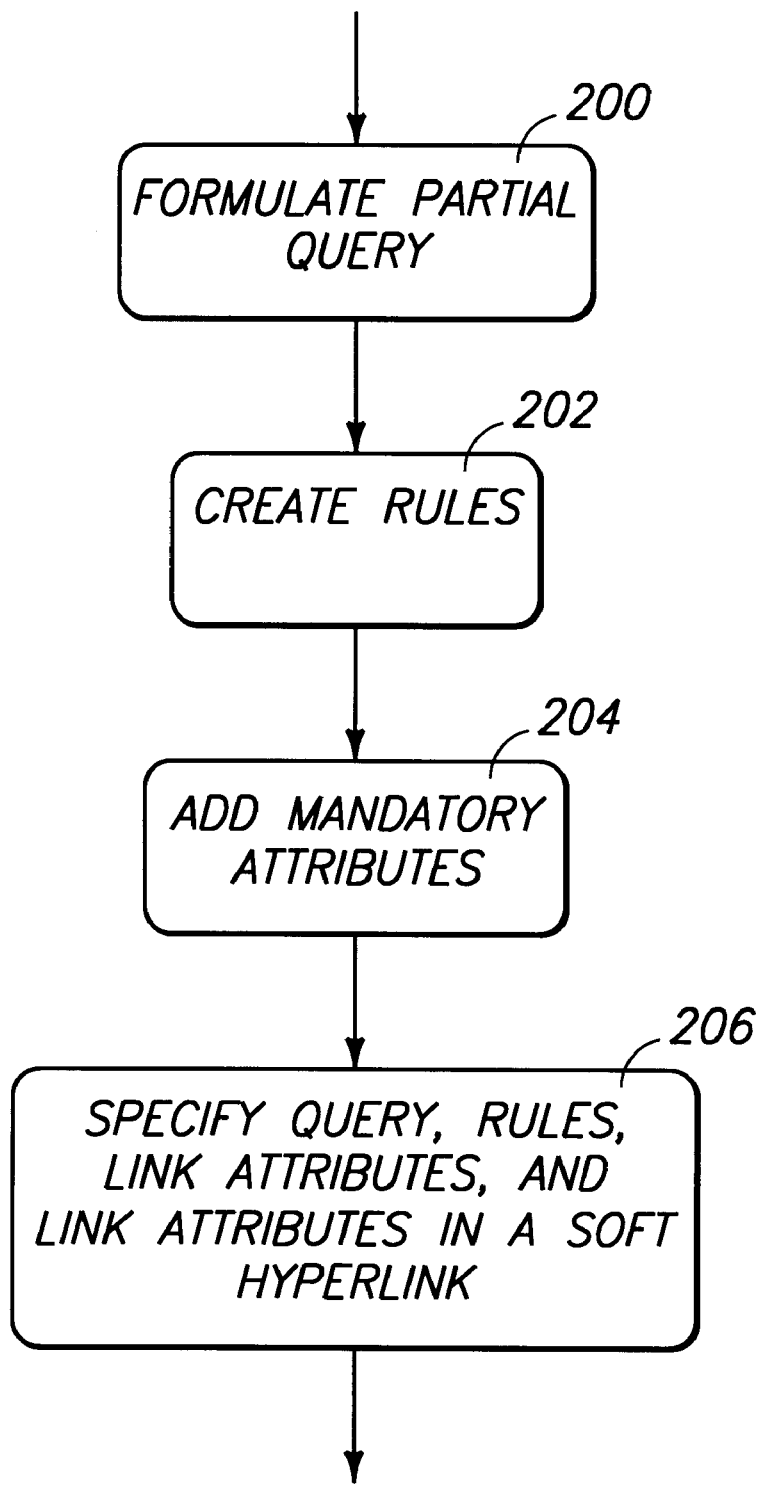
FIG. 5 is a flow chart showing methodological steps of specifying a hyperlink in accordance with the invention.

FIG. 5 shows preferred steps for specifying a soft hyperlink. The method includes a step 200 of formulating a partial query formulation. In the preferred embodiment, the query formulation is specified at least partially in terms of query attributes and of values for said query attributes.

A step 202 comprises creating one or more executable rules. Each rule, when executed, potentially examines a user's list of bound attributes. In response to the values of the bound attributes, a rule might add values to the user's list of bound attributes and might perform a step of adding search predicates to the query formulation of step 200.

A step 204 comprises associating each executable rule with a set of mandatory attributes that condition execution of the rule. A rule will not execute unless all of its mandatory attributes are present in the user's list of bound attributes.

A subsequent step 206 comprises embedding or specifying the partial query formulation, the rules, the link attributes, and the mandatory attributes in a hyperlink. This step also includes embedding or specifying link bound attributes in the hyperlink, for eventual inclusion in the user's list of bound attributes.

Specifying this information in a hypermedia document is accomplished using appropriate extensions to SGML. More specifically, the information is specified as one or more parameters corresponding to appropriately defined SGML tag attributes. A partial query formulation is actually specified as a list of attribute name and value pairs. Link attributes are specified in a similar way, while mandatory attributes are specified as a list of attribute names. Rules are preferably specified by global identifiers, possibly accompanied by a URL to a location from where the rules can be retrieved. Alternatively, there might be a central repository from which any rule can be retrieved by referring to its global identifier.

Figure 6:
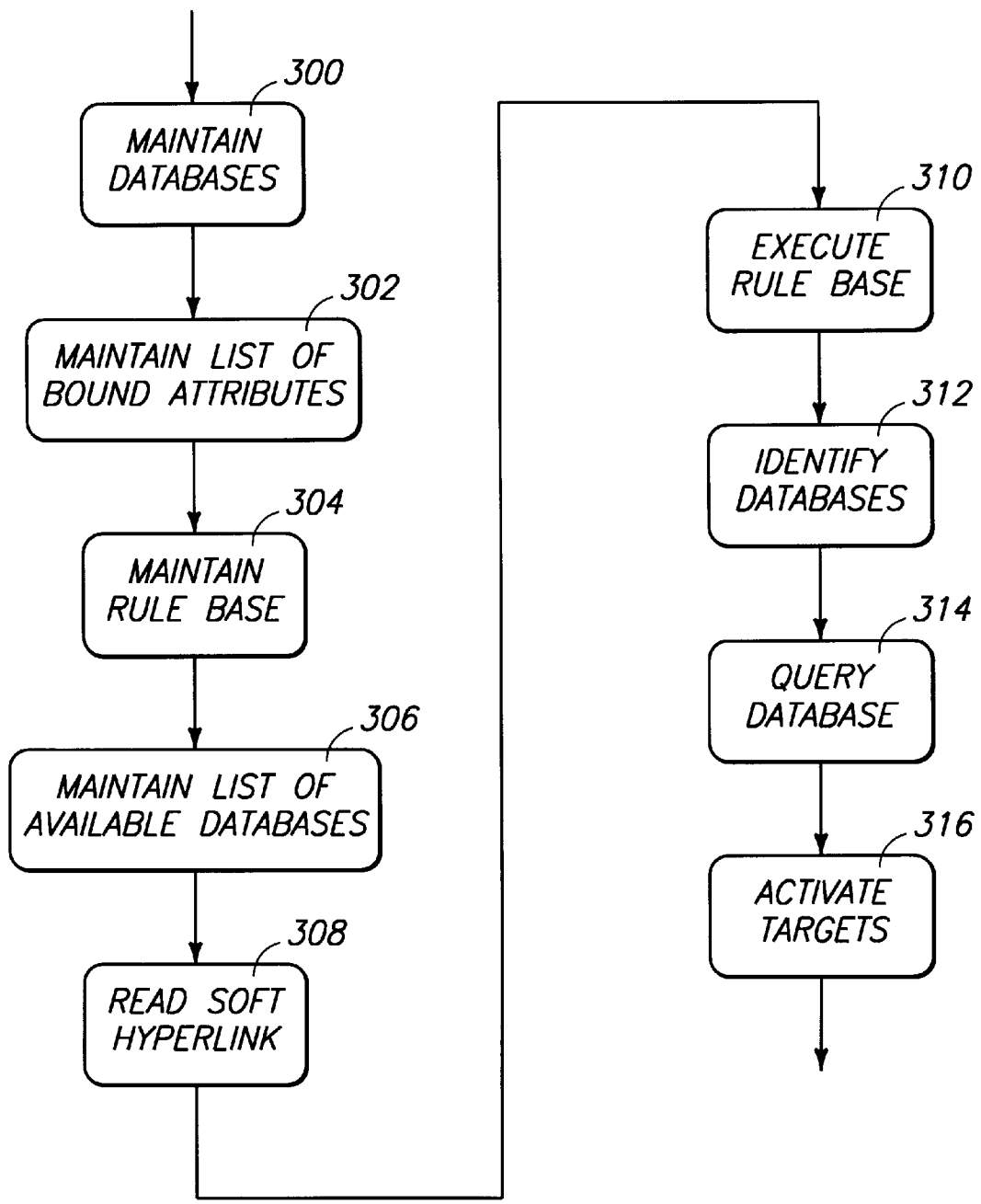
FIG. 6 is a flow chart showing methodological steps of resolving a hyperlink in accordance with the invention.

FIG. 6 shows preferred steps for resolving a soft hyperlink such as one specified in accordance with the steps of FIG. 5. A step 300 comprises maintaining a plurality of databases of available hyperlink targets. Each such database is searchable by means of one or more query attributes supported by the database and relating to the available hyperlink targets. In the preferred embodiment, each database supports one or more schemata, where each schema defines a plurality of individual attributes by name and type.

A step 302 comprises maintaining a list of bound attributes in a user's computer. Again, the names and types of these attributes are defined by one or more schemata. The list of bound attributes includes ambient bound attributes that are independent of any particular hypermedia content or selected hyperlink. A user profile is one source of values for ambient bound attributes. The list of bound attributes further includes link bound attributes that are specified in a selected hyperlink, and context bound attributes that are specified in a particular current or selected hypermedia document or resource.

A step 304 comprises maintaining a rule base of executable rules in the user's computer. Each rule in the rule base is associated with a set of mandatory attributes. Both ambient and link rules are maintained in the rule base. Ambient rules are rules that are specified independently of any particular hyperlink. These rules might be specified by a model that is registered on a user's computer. Link rules, on the other hand, are rules that are specified by a currently-selected soft hyperlink.

A further step 306 comprises maintaining a list of available databases and of the schemata or query attributes supported by the respective databases. This list is maintained on the user's computer.

A step 308 comprises reading a selected soft hyperlink from a hypermedia document or resource. This step includes identifying and/or extracting a query formulation, one or more executable rules (or the global identifiers of the rules) and associated mandatory attributes, and one or more link bound attributes from the selected hyperlink. These elements arc specified in the hyperlink as described above with reference to FIG. 5. The executable rules and associated mandatory attributes are put into the rule base, and the link bound attributes are added to the user's current bound attribute list.

A step 310 comprises executing the rules of the rule base to potentially add search predicates to the query formulation originally obtained from the soft hyperlink. This step comprises stepping through the rules of the rule base and executing any rule whose mandatory attributes are in the user's list of bound attributes. In the preferred embodiment, this step is repeated until no more rules are executed by further repetitions. When this step is completed, the query will be ready for submission to an appropriate database.

Step 312 comprises identifying one or more databases that support one or more of the query attributes specified in the query formulation as modified by the executable rules. More specifically, this step comprises determining which schemata define the attributes specified in the modified query formulation, and then examining the user's list of databases to determine which databases support the schemata. Thus, the database or databases are selected depending on the search predicates specified and added to the query formulation.

A further step 314 in accordance with the invention comprises querying the identified database or databases with the modified query formulation to locate one or more hyperlink targets having attributes and attribute values that satisfy the query formulation. The query potentially locates one or more hyperlink targets.

A subsequent step 316 comprises activating one or more of the hyperlink targets located in step 314. The activating step consists of opening, displaying, or otherwise rendering the hypermedia resource targeted by the located hyperlink target(s). If querying the identified database(s) locates a plurality of hyperlink targets, the targets are listed in a conventional WWW format so that the user can select one of the hyperlink targets for activation. If only a single target is located, this target is activated immediately, without further user intervention.

The invention described above stresses transparency to the user, utilizing data and modeling techniques to inform client-side and server-side queries against a database of possible targets or destinations. Hyperlinks are resolved when they are selected, rather than when they are authored. For example, an author of a hypermedia document might include an "interesting sidebar about Chechnya" as a hyperlink. The methods above can use knowledge of the user's age in determining whether to jump to encyclopedia-like sources, children's titles, or dissertation-level content.

In creating a hyperlink, the author provides only the minimum set of data needed by the system to aid in resolving hyperlinks, such as a search predicate indicating that the query should be limited to a particular topic like "restaurants." The system itself combines this data with other information, gleaned independently of the author, and formulates a query against a database of logical targets or destinations. If the query is sufficiently determined, the result of the query will return a single logical destination and the destination will be activated. Otherwise, the user may be presented with a list of possible destinations from which to choose.

The invention offers great flexibility to authors of hypermedia content. In addition, its use will be of enormous benefit to end users by decreasing the frustration that is so often associated with trying to locate specific types of hypermedia.

In compliance with the statute, the invention has been described in language more or less specific as to structural and methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A method of resolving a hyperlink, comprising the following steps:

receiving a hyperlinked document from a remote server, the hyperlinked document containing one or more hyperlinks, at least one of the hyperlinks containing a query formulation;

in response to selection of said at least one of the hyperlinks by a user, reading a query formulation from the selected hyperlink;

querying one or more database servers with the query formulation to locate one or more hyperlink targets that satisfy the query formulation, wherein at least some of the hyperlink targets specify hypermedia documents from servers other than the one or more database servers;

retrieving a hypermedia document specified by one of the located hyperlink targets from a server other than the one or more database servers;

rendering said retrieved hypermedia document.

2. A computer-readable storage medium containing instructions that are executable to perform the steps of claim 1.

3. A method as recited in claim 1, further comprising a step of selecting the database from a plurality of databases depending on search predicates specified in the query formulation.

4. A computer-readable storage medium containing instructions that are executable to perform the steps of claim 1.

5. A method as recited in claim 1, further comprising:

maintaining a list of bound attributes that are independent of the selected hyperlink;

adding search predicates to the query formulation based on said bound attributes.

6. A method as recited in claim 1, further comprising:

maintaining a list of bound attributes that are independent of the selected hyperlink, said bound attributes being based upon a user profile;

adding search predicates to the query formulation based on said bound attributes.

7. A method as recited in claim 1, further comprising:

maintaining a list of bound attributes that are independent of the selected hyperlink;

identifying one or more executable link rules from the selected hyperlink;

executing the link rules to add search predicates to the query formulation depending on said bound attributes.

8. A method as recited in claim 1, further comprising:

maintaining a list of bound attributes that are independent of the selected hyperlink;

identifying one or more executable link rules from the selected hyperlink;

executing the link rules to add search predicates to the query formulation depending on said bound attributes;

selecting the database from a plurality of databases depending on search predicates specified in and added to the query formulation.

9. A method of resolving a hyperlink, comprising the following steps:

receiving a hyperlinked document from a remote server, the hyperlinked document containing one or more hyperlinks, at least one of the hyperlinks containing a query formulation;

in response to selection of said at least one of the hyperlinks by a user, reading the query formulation from the selected hyperlink;

maintaining a list of bound attributes on an individual computer;

identifying one or more executable link rules that are specified in the selected hyperlink, wherein an identified link rule is associated with a set of mandatory attributes;

executing any particular link rule if and only if all of its mandatory attributes are in the list of bound attributes maintained on the individual computer, wherein executing a link rule potentially adds search predicates to the query formulation depending on said bound attributes maintained on the individual computer;

querying a database of available hyperlink targets with the query formulation to locate one or more hyperlink targets that satisfy the query formulation.

10. A computer-readable storage medium containing instructions that are executable to perform the steps of claim 9.

11. A method as recited in claim 9, the step of maintaining a list of bound attributes comprising maintaining ambient bound attributes that are independent of the selected hyperlink and link bound attributes that are specified by the selected hyperlink.

12. A method as recited in claim 9, the step of maintaining a list of bound attributes comprising maintaining ambient bound attributes that are independent of the selected hyperlink, context bound attributes that are specified in a selected hypermedia document, and link bound attributes that are specified by the selected hyperlink.

13. A method as recited in claim 9, wherein executing a link rule includes a step of examining the list of bound attributes to determine whether to add a search predicate to the query formulation.

14. A method as recited in claim 9, wherein executing a link rule potentially adds attributes to the bound attribute list.

15. A method as recited in claim 9, further comprising a step of selecting the database from a plurality of databases depending on search predicates specified in and added to the query formulation.

16. A method as recited in claim 9, further comprising a step of executing ambient rules that are specified independently of the selected hyperlink.

17. A method of resolving a hyperlink, comprising the following steps:

receiving a hyperlinked document from a remote server, the hyperlinked document containing one or more hyperlinks, at least one of the hyperlinks containing a query formulation;

in response to selection of said at least one of the hyperlinks by a user, reading the query formulation from the selected hyperlink;

maintaining a list of bound attributes on an individual computer;

maintaining a rule base of executable rules on the individual computer, wherein an executable rule is associated with a set of mandatory attributes, and wherein executing a rule potentially adds search predicates to the query formulation depending on the bound attributes on the individual computer;

stepping through the rules of the rule base and executing any rule whose mandatory attributes are in the list of bound attributes maintained on the individual computer;

querying a database of available hyperlink targets with the query formulation to locate one or more hyperlink targets that satisfy the query formulation.

18. A computer-readable storage medium containing instructions that are executable to perform the steps of claim 17.

19. A method as recited in claim 17, wherein maintaining the rule base comprises maintaining ambient rules that are specified independently of the selected hyperlink and link rules that are specified by the hyperlink.

20. A method as recited in claim 17, further comprising a step of repeating the steps of stepping through the rules of the rule base and executing any particular rule whose mandatory attributes are in the list of bound attributes.

21. A method as recited in claim 17, wherein executing a rule includes a step of examining the list of bound attributes to determine whether to add a search predicate to the query formulation.

22. A method as recited in claim 17, wherein executing a rule potentially adds attributes to the bound attribute list, the method further comprising a step of repeating the steps of stepping through the rules of the rule base and executing any particular rule whose mandatory attributes are in the list of bound attributes.

23. A method as recited in claim 17, the step of maintaining a list of bound attributes comprising maintaining ambient bound attributes that are independent of the selected hyperlink and link bound attributes that are specified in the selected hyperlink.

24. A method as recited in claim 17, the step of maintaining a list of bound attributes comprising maintaining ambient bound attributes that are independent of the selected hyperlink, context bound attributes that are specified in a selected hypermedia document, and link bound attributes that are specified in the selected hyperlink.

25. A method as recited in claim 17, further comprising a step of selecting the database from a plurality of databases depending on search predicates specified in and added to the query formulation.

26. A method as recited in claim 17, wherein:

the step of maintaining the rule base comprises maintaining ambient rules that are specified independently of the selected hyperlink and link rules that are specified by the hyperlink;

the step of maintaining a list of bound attributes comprising maintaining ambient bound attributes that are independent of the selected hyperlink and link bound attributes that are specified by the selected hyperlink;

executing a rule includes a step of examining the list of bound attributes to determine whether to add a search predicate to the query formulation;

executing a rule potentially adds attributes to the bound attribute list;

the method further comprises selecting the database from a plurality of databases depending on search predicates specified in and added to the query formulation.

27. A method of specifying a hyperlink, comprising the following steps:

embedding a query formulation in the hyperlink;

embedding one or more executable rules in the hyperlink, wherein an individual executable rule, when executed, performs the following steps:

examining a list of attributes on an individual computer;

adding a search predicate to the query formulation depending on the values of the attributes.

28. A method as recited in claim 27, further comprising a step of specifying the query formulation at least partially in terms of query attributes and of values for said query attributes.

29. A method as recited in claim 27, further comprising associating each of the executable rules with one or more mandatory attributes and executing an individual executable rule if and only if its mandatory attributes are bound in the list of attributes on the individual computer.

30. A method as recited in claim 27, wherein the executable rules, when executed, potentially perform a step of adding attributes to the list of bound attributes on the individual computer.

31. A method as recited in claim 27, further comprising a step of specifying bound attributes in the hyperlink for inclusion in the list of bound attributes on the individual computer.

32. A method as recited in claim 27, further comprising:

embedding bound attributes in the hyperlink for inclusion in the list of bound attributes on the individual computer.

33. A computer-readable storage medium containing a hypermedia file, the hypermedia file comprising:

informational content for rendering to a user;

a hyperlink among the informational content that can be activated by the user when the informational content is rendered;

the hyperlink including a query formulation that can be submitted to a database for resolution of the hyperlink;

wherein the hyperlink further includes:

one or more executable rules associated respectively with sets of mandatory attributes;

one or more bound attributes for inclusion in a list of bound attributes maintained on an individual computer;

the rules being executable to examine the list of bound attributes and to potentially add query predicates to the query formulation depending on said examination of the list of bound attributes.

34. A computer-readable storage medium as recited in claim 33 wherein the query formulation is specified at least partially in terms of query attributes and of values for said query attributes.

35. A computer-readable storage medium as recited in claim 33, the rules being respectively associated with sets of mandatory attributes, said rules being executable to potentially add query predicates to the query formulation depending on whether the mandatory attributes are bound.

36. A computer-readable storage medium as recited in claim 33, said rules being executable to potentially add attributes to a list of bound attributes.

37. A computer-readable storage medium as recited in claim 33, the hyperlink further specifying bound attributes for inclusion in the list of bound attributes.

38. A hypermedia-based navigation system comprising:
one or more database servers having databases of available hyperlink targets, each such database being searchable by means of one or more query attributes supported by the database and relating to the available hyperlink targets;
an information provider that provides a hypermedia document, the hypermedia document having at least one hyperlink, said hyperlink containing a query formulation that is specified at least partially in terms of query attributes and of values for said query attributes;
a client configured to resolve the hyperlink by querying at least one of the databases with the query formulation from the hyperlink to locate one or more hyperlink targets having attributes and attribute values that satisfy the query formulation;
wherein at least some of the hyperlink targets specify hypermedia documents from servers other than the one or more database servers.

39. A hypermedia-based navigation system as recited in claim 38, wherein the client is further configured to activate said one or more hyperlink targets.

40. A hypermedia-based navigation system as recited in claim 38, wherein the hyperlink contains one or more executable rules or potentially adding search predicates to the query formulation.

41. A hypermedia-based navigation system as recited in claim 38, further comprising a list of bound attributes maintained by the client, herein the hyperlink contains one or more executable rules for potentially adding search predicates to the query formulation depending on said bound attributes.

42. A hypermedia-based navigation system as recited in claim 38, further comprising a list of bound attributes maintained by the client, said bound attributes being based on a user profile, wherein the hyperlink contains one or more executable rules for potentially adding search predicates to the query formulation depending on said bound attributes.

43. A hypermedia-based navigation system as recited in claim 38, wherein the client is configured to identify one or more of the databases that support one or more of the query attributes specified in the query, and to resolve the hyperlink by querying at least one of the identified databases with the query formulation.

44. A hypermedia-based navigation system as recited in claim 38, wherein the client is configured to maintain a rule base of executable rules for potentially adding search predicates to the query formulation, said executable rules including ambient rules that are specified independently of the selected hyperlink and link rules that are specified by the hyperlink.

45. A hypermedia-based navigation system as recited in claim 38, further comprising a list of bound attributes maintained by the client, said list of bound attributes including ambient bound attributes that are independent of the selected hyperlink and link bound attributes that are specified in the selected hyperlink.

46. A hypermedia-based navigation system as recited in claim 38, further comprising a list of bound attributes maintained by the client, said list of bound attributes including ambient bound attributes that are independent of the selected hyperlink, context bound attributes that are specified in a selected hypermedia document, and link bound attributes that are specified in the selected hyperlink.

47. A method of navigating hypermedia documents comprising the following steps:
displaying at least one soft hyperlink to a user, the soft hyperlink containing a query and one or more link rules;
in response to the user activating said soft hyperlink, reading the query and one or more link rules from the soft hyperlink; executing one or more of the link rules to add one or more search predicates to the query; and performing the query to locate one or more hypermedia targets, said query being based at least in part upon attributes associated with the user;
as a result of the query, displaying hyperlinks to said one or more hypermedia targets.

48. A method as recited in claim 47, further comprising identifying said attributes without requesting search limitations from the user.

49. A method as recited in claim 47, wherein the step of displaying hyperlinks comprises displaying hard hyperlinks to said one or more hypermedia targets.

50. A method as recited in claim 47, wherein the query is further based upon attributes specified in the soft hyperlink.

51. A method as recited in claim 47, further comprising displaying a hypermedia document to the user, the hypermedia document including said at least one soft hyperlink, wherein the query is further based upon attributes specified in the hypermedia document.

52. A method as recited in claim 47, further comprising displaying a hypermedia document to the user, the hypermedia document including said at least one soft hyperlink, wherein the query is further based upon attributes specified in the hypermedia document and upon attributes specified in the soft hyperlink.

* * * * *

UNITED STATES PATENT AND TRADEMARK OFFICE
CERTIFICATE OF CORRECTION

PATENT NO.    : 6,098,081
DATED         : August 1, 2000
INVENTOR(S)   : Christopher S. Heidorn et al.

It is certified that error appears in the above-identified patent and that said Letters Patent is hereby corrected as shown below:

<u>Column 1,</u>
Line 44, replace "(URIs)" with -- (URLs) -- .

<u>Column 5,</u>
Line 33, add -- a -- between "As" and "result".

<u>Column 12,</u>
Line 20, replace "arc" with -- are --.

<u>Column 17,</u>
Line 45, change "or" to -- for --.
Line 50, change "herein" to -- wherein --.

Signed and Sealed this

Second Day of October, 2001

*Attest:*

*Nicholas P. Godici*

*Attesting Officer*

NICHOLAS P. GODICI
*Acting Director of the United States Patent and Trademark Office*